United States Patent
Yamada et al.

[11] Patent Number: 5,118,092
[45] Date of Patent: Jun. 2, 1992

[54] DOCUMENT FEEDING APPARATUS

[75] Inventors: Yasushi Yamada; Yoshikazu Maekawa; Hiroyuki Arai; Susumu Okui; Tsugio Hirabayashi, all of Hachioji; Toshihide Miura, Koganei, all of Japan

[73] Assignee: Konica Corporation, Tokyo, Japan

[21] Appl. No.: 475,146

[22] Filed: Feb. 5, 1990

[30] Foreign Application Priority Data

Feb. 13, 1987 [JP] Japan .................................. 62-29846
Mar. 25, 1987 [JP] Japan .................................. 62-70750
Mar. 25, 1987 [JP] Japan .................................. 62-70755
Mar. 25, 1987 [JP] Japan .................................. 62-70756

[51] Int. Cl.$^5$ .............................................. B65H 5/02
[52] U.S. Cl. ...................................... 271/275; 271/198
[58] Field of Search ................................ 271/275, 198

[56] References Cited

U.S. PATENT DOCUMENTS 4,066,255 1/1978 Bradbury ..................... 271/275 X
4,350,332 9/1982 Knight ......................... 271/275 X Primary Examiner—Richard A. Schacher
Attorney, Agent, or Firm—Jordan B. Bierman

[57] ABSTRACT

A document feeding apparatus having a conveyor belt which moves documents along a platen glass plate of a photoreproducing machine, first and second rollers which support the conveyor belt, a driving source connected to the first roller, and a member for driving the second roller so that it prevents the conveyor belt from slackening. In preferred forms of the device, the first roller is connected to the second roller by a one-way clutch and the line speed of the first or second roller on the document feed side is greater than the line speed of the first or second roller on the discharge side.

5 Claims, 11 Drawing Sheets

DOCUMENT FEEDING APPARATUS

This application is a division of Ser. No. 155,302, filed Feb. 12, 1988 now U.S. Pat. No. 4,944,504; which, in turn, claims the priorities of Japanese Applications 29,846,87, filed Feb. 13, 1987 and 70,750/87, 70,755/87, and 70,756/87, all filed Mar. 25, 1987.

BACKGROUND OF THE INVENTION

1. Field of the Invention

The present invention relates to a document feeding apparatus which can repeatedly process documents by separating and automatically feeding the documents stacked on a document stacker one by one onto the platen glass plate of a reproducing machine and by returning, if necessary, the documents exposed on the platen glass plate again to the document stacker.

2. Description of the Prior Art

Generally speaking, some document feeding apparatus (ADF) of this kind can separate and feed the documents stacked on a document stacker one by one onto the platen glass plate of a reproducing machine and to discharge the documents exposed on the platen glass plate to a discharge dish outside of the machine. Another document feeding apparatus (RDF) can perform repeated feeding by returning the exposed documents to the document stacker. Since these document feeding apparatus are equipped at their paper feed aperture with a document separating mechanism, they cannot feed either documents which are so liable to be broken that cannot withstand passage through the separating mechanism or documents which are difficult to be separated by the separating mechanism. In order to feed such documents, therefore, those document feeding apparatus are frequently provided additionally in the prior art with a function (SDF) to automatically feed the documents one by one. For example, a paper feed aperture having no separating mechanism is additionally provided separately from the paper feed aperture of the ADF or RDF so that the documents may be set one by one in the paper feed aperture added. In another system, the paper feed apertures of the ADF or RDF and SDF are used in common so that the documents may be fed in the SDF mode each time they are set one by one by the user.

Despite of this fact, however, the former system has operation problems and a complicated construction because of two paper feed apertures, and the latter system still cannot be free from the damage of the documents because the documents will pass through the separating unit even in the SDF mode.

The separation at the paper feeding unit is a remarkably important function in a circulation type document feeding apparatus (RDF) in which copies are formed one by one in one circulation so that the documents are circulated as many times as the number of the formed copies. A so-called "bottom feed—top return" system has been adopted in the prior art as the paper feeding system excellent in that separating function This system repeats the operations to separate and feed the documents stacked on the document stacker one by one from the lowermost one to the processing unit and to return the exposed documents to the uppermost position of the documents being fed when they are returned to the document stacker. This bottom feed is divided into two techniques: one adsorbs and separates one document by making use of suction and the other frictionally separates the documents by using a paper feeding belt and a stop roller forced to contact the belt. The latter technique has a merit over the former in that the system can be produced at a lower cost and with a compact construction so that it can be adjusted and maintained more simply. This technique is represented by a document feeding apparatus, as shown in FIG. 15. In this apparatus, a document stacker 140 is inclined steeply downhill in the paper feeding direction and has its lower end portion provided with a paper feeding aperture 141. One document fed out from this aperture 141 is guided via a paper feed passage 142 onto the platen glass plate 143 of a reproducing machine. The document thus guided is conveyed to an exposure position by the forward rotation of a conveyor belt 144 which is disposed over the platen glass plate 143. The document thus conveyed to the exposure position is subjected to an exposure by reciprocating an exposing optical system 145. The exposed document is then conveyed back by reversing the conveyor belt 144 until it is discharged in the opposite direction to the feeding direction onto the document stacker 140 through a paper discharge passage 146 from a paper discharge aperture 147 which is formed above the paper feeding aperture 141. At last, the document thus discharged is returned to the uppermost one of the unprocessed documents on the document stacker 140. In this case, the unprocessed documents and the processed and restacked documents are separated by a partition 148, which is disposed just upstream of the paper feeding aperture 141. The partition 148 makes one turn in a counterclockwise direction, after the last one of the unprocessed documents has been restacked through the processing unit, to ride on the uppermost document. After this, the document having made one circulation is placed on that partition 148.

In the apparatus described above, however, the angle of the downhill of the document stacker 140 has to be steep so that the stacker 140 has a very large total height. Since the restacked documents are set in the paper feeding unit 141 after their natural drops, their leading edges are not well arranged. Moreover, the restacked documents may fail to drop completely because of bending or curling and may be caught in their dropping courses, thus seriously deteriorating the separating performance. Because of the steep angle of the downhill of the document stacker 140, the restacked documents may steal below the aforementioned partition 148. Since, moreover, the documents have to be fed back after they have been once exposed at the exposing position of the platen glass plate, another problem is that the document interchanging rate is lowered.

SUMMARY OF THE INVENTION

An object of the present invention is to solve the problems thus far described and to provide a document feeding apparatus which can feed documents without any damage by making the paper feeding aperture of the ADF or RDF identical to that of the SDF to simplify the construction and by inactivating the separating means of the ADF or RDF in response to the SDF mode.

Another object is to provide a document feeding apparatus which can simplify the paper feeding structure and reduce the size and cost of the apparatus as a whole by having a driving power source shared between the separating means and its associated means to reduce the number of parts.

In order to achieve the above-specified objects, the present invention is characterized by a document feeding apparatus comprising an up-and-down drive means for moving up a gate member, when documents set on a document stacker are to be pushed out by a rear end regulating plate, and for moving down the same onto the documents when the documents move to a predetermined position; one rotation control means for controlling one rotation of a push belt to push the document in said predetermined position to a paper feed position; and driven rotation control means for controlling the driven rotation of a stop roller for preventing the overlapped feed of the document and being in contact with a paper feeding belt for delivering the documents in the paper feeding position from the lowermost one, so that each means may be simplified in association with others without any malfunction.

Another object of the present invention is to provide a document feeding apparatus which can feed documents without any steep inclination of a document stacker and to return the documents having been exposed on a platen glass plate through a closed loop to the document stacker In order to achieve the above-specified object, the present invention is characterized by a document feeding apparatus wherein a document rear end regulating member is disposed movably in a paper feeding direction at the back of a document stacker having a paper feeding unit at its front, and so that the front of the document stacker in the paper feeding direction is inclined not steeply downward but rather gently upward so that the set documents may be pushed forward to the paper feeding unit and so that the documents having been exposed on the platen glass plate may be returned to an initial or a designated position before they are returned to the document stacker.

Still another object of the present invention is to provide a document feeding apparatus which is enabled to feed documents on a document stacker without any steep inclination by pushing the documents with the rear end regulating plate, to improve the arrangeability, separatability and interchanging rate of the documents, and to interrupt the paper feed if the documents to be fed are of improper size.

In order to achieve the above-specified object, according to the present invention, there is provided a document feeding apparatus having a rear end regulating plate at the back of a document stacker for pushing documents toward a paper feeding aperture, which apparatus comprises: means for detecting the initial position of said rear end regulating plate; means for detecting the leading ends of the documents in the vicinity of said paper feeding aperture; means for detecting the movement from said initial position to the position in which the leading ends of the documents are detected; and means for detecting the document size based on said movement, wherein said rear end regulating plate can be retracted to a position according to said document size till the document fed from said document stacker returns in a closed loop through a processing unit to said document stacker.

Yet another object of the present invention is to provide a document feeding apparatus which can simplify means for discharging papers as the paper discharging aperture at the rear end of the document stacker is moved.

In order to achieve the above-specified object, according to the present invention, there is provided a document feeding apparatus wherein a document is fed from the front of a document stacker towards a processing unit and then the document is returned from the processing unit to the document stacker through the rear portion thereof, characterized in that a discharging belt is supported by a plurality of supporting rollers for feeding the document discharged from the processing unit to a discharging aperture which is variable the discharging position on the document stacker, in that the upper end rollers of said supporting rollers are able to be displaced as the position of the discharging aperture is varied in position while the lower end rollers are able to be moved towards a direction for maintaining a belt tension in synchronous with the movement of the upper end rollers, so that the paper can be discharged simply and stably without loss of document discharging function.

Another object of the present invention is to provide a document feeding apparatus which can effectively feed documents onto a platen glass plate and move the documents along the platen glass plate while the conveying force of a belt is maintained in a stable condition for any of types of large numbers of document transfer such as RDF system document feeding apparatus, document being exposed during moving wherein the variation of the document transfer speed directly effects the quality of the reproduced image or the conveyor belt being reversibly rotated to provide copies of a both surface document.

In order to achieve the above-specified object, according to the present invention, there is provided a document feeding apparatus including a conveyor belt for moving documents along a platen glass plate of a reproducing machine, characterized in that one of a pair of rollers supporting said conveyor belt is connected to a drive source and the other roller is interconnected to said one roller, so that the conveyor belt is usually driven by a force for driving the roller at the document feed in side, but the conveyor belt is driven by a driving force caused by the roller at the document discharge side if the roller at the document feed in side should be slipped.

Other objects and features of the present invention will become apparent from the following description taken with reference to the accompanying drawings.

DESCRIPTION OF THE PREFERRED EMBODIMENTS

Figure 1:
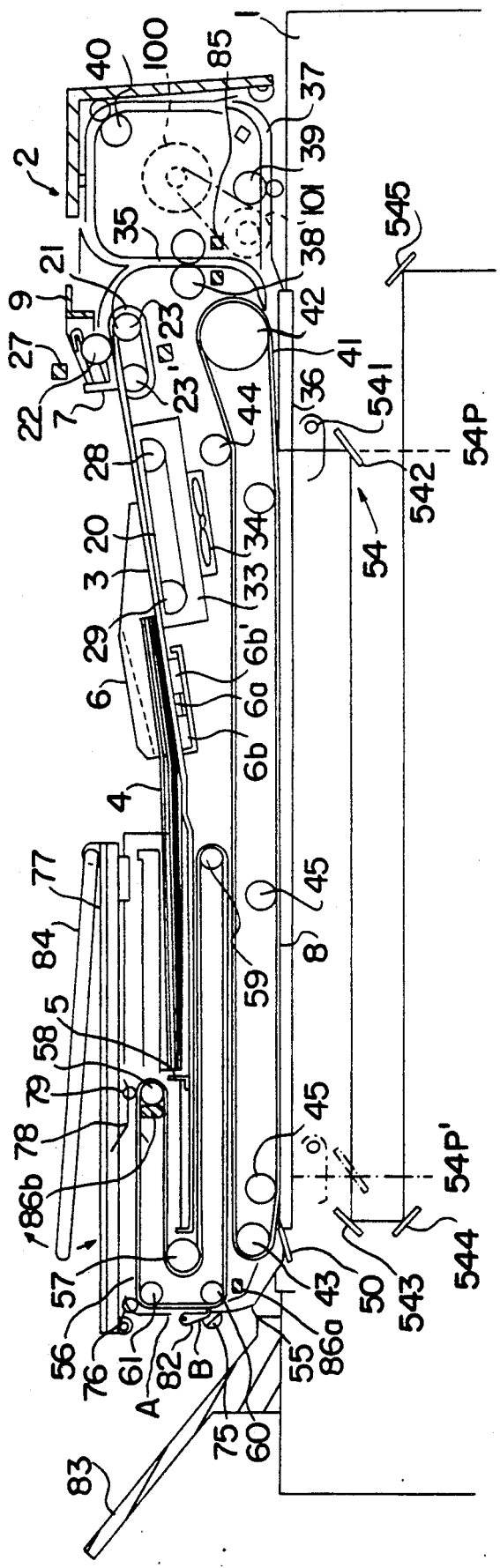
FIG. 1 is a sectional front elevation showing a document feeding apparatus.

In FIG. 1, reference numeral 1 designates a reproducing machine which can select between two copy modes having an exposing optical system moving and fixed. Numeral 2 designates a document feeding apparatus. This document feeding apparatus 2 is equipped with a document stacker 3 having its front portion rising upward. On this document stacker 3, there are mounted a rear end regulating member 5, by which are regulated the rear ends of documents 4 when the latter are to be set, and transverse width regulating plates 6 and 6' for regulating the widths of the documents 4. These transverse width regulating plates 6 and 6' are in meshing engagement, at the lower side of the document stacker 3, with racks 6b and 6b' which can transversely slide alternately across a pinion gear 6a so that they can move symmetrically with respect to the center. The transverse size of the documents can be read out by detecting the movements of the transverse width of regulating plates 6 and 6' with a not-shown sensor. On the other hand, the aforementioned rear end regulating member 5 has a function to push the leading ends of the documents 4, which are set on the document stacker 3, to the (fixed) detection position of a stack sensor 27.

Figure 3:
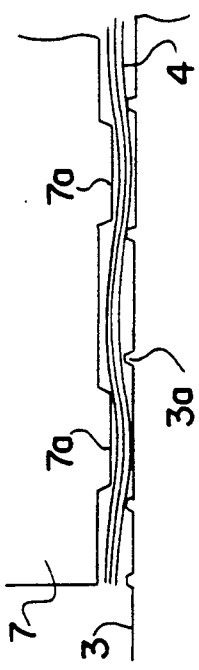
FIG. 3 is an explanatory view showing a deformed state of documents pushed onto a document stacker by a gate member.
Figure 2:
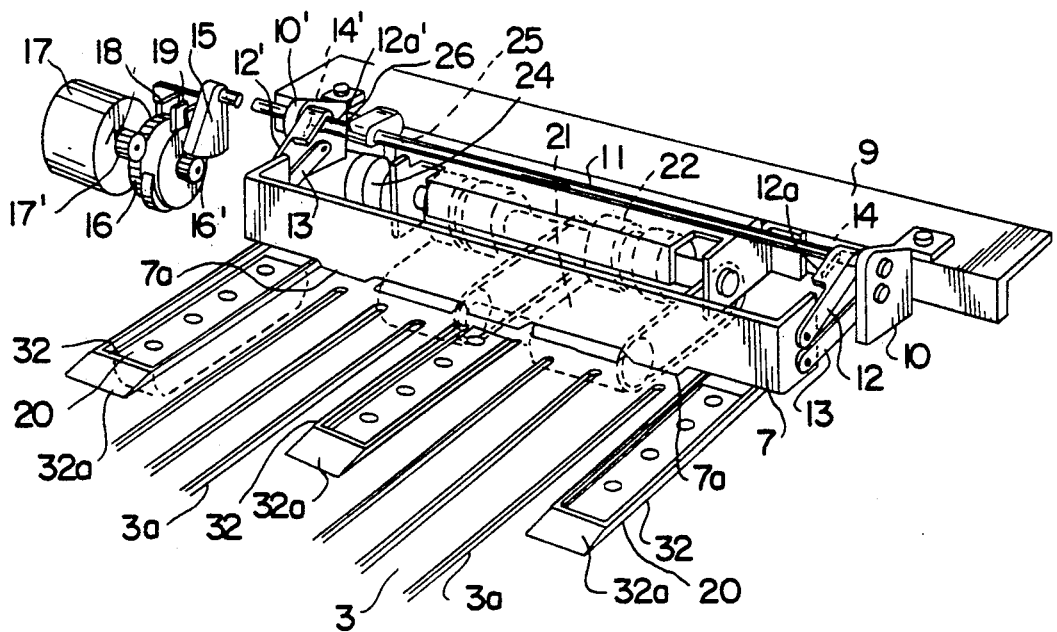
FIG. 2 is a perspective view showing a document stacker and a paper feed means.

Reference numeral 7 designates a gate member which takes an upper position, when the documents 4 pushed forward by the action of the aforementioned rear end regulating member 5, and which is moved downward onto the documents 4 by its own weight in response to a signal from said stack sensor 27 when the leading ends of the documents reach the detection position of the stack sensor 27. The gate member 7 has functions to hold the documents 4 to be fed by its own weight and to abut against the leading ends of the documents, which have made one circulation through a processing unit 8 and returned onto the document stacker 3, as will be described hereinafter, thereby to arrange the leading ends for a subsequent feed and to discriminate the restacked documents from the documents being fed. Thus, in order to exhibit those functions effectively, according to the present embodiment, the document stacker 3 are provided on its upper surface with ribs 3a which extend at a suitable interval in the paper feeding direction, as shown in FIG. 2, and the gate member 7 is provided at its lower end edge with a plurality of projections 7a which correspond to the invervals of the ribs 3a in the form of the so-called "comb teeth". In other words, the documents on their stacker 3 are undulated, as shown in FIG. 3, by the ribs 3a and the comb-toothed projections 7a to give a firmness to the documents 4 being fed and to effectively prevent the leading ends of the returned documents from sinking below the gate.

Figure 4A:
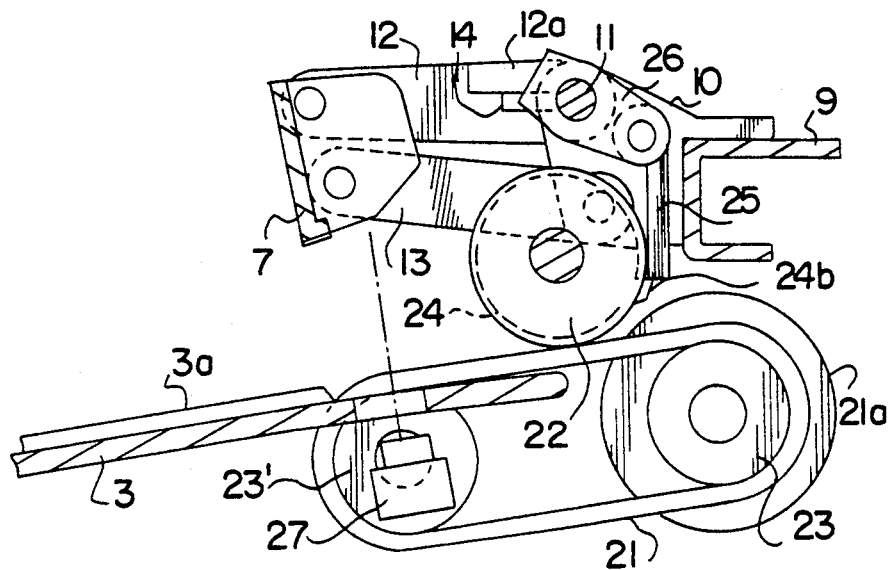
FIGS. 4 A and 4 B are explanatory views showing the operating states of the gate member.
Figure 4B:
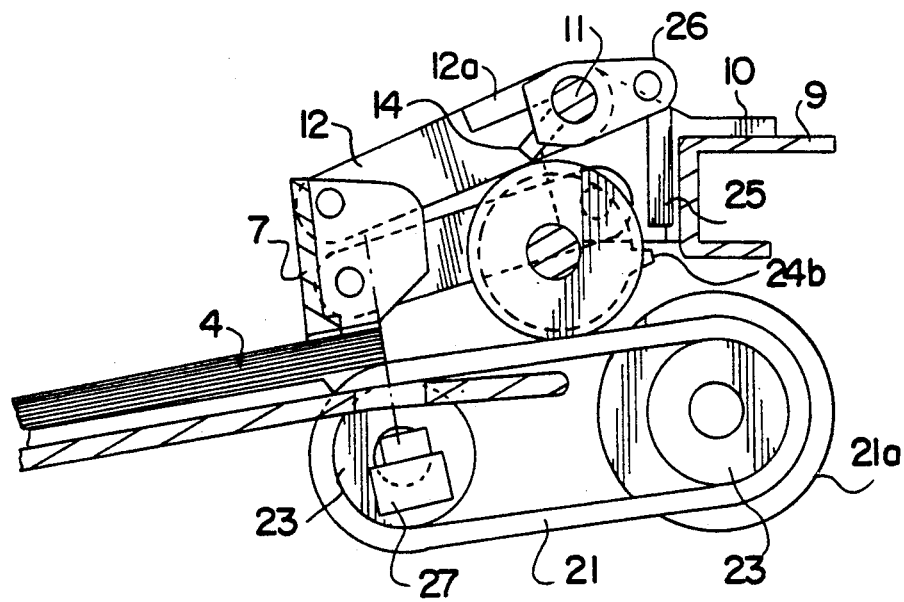

The aforementioned gate member 7 is formed generally in the shape of letter "C", as viewed in top plan, and has its two sides pivotally supported, as shown in FIG. 2, by both the leading ends of right and left gate levers 12 and 12', which having their base end portions fitted loosely on a shaft 11 borne rotatably on upper portions of brackets 10 and 10' fixed on a front frame 9 of the document feeding apparatus 2 by means of screws or the like, and the leading ends of auxiliary levers 13 and 13' which have their base end portions borne rotatably in lower sides of the brackets 10 and 10'. The gate levers 12 and 12' are provided at upper portions of their inner edges with extensions 12a and 12a' having lower sides, against which abut push-up pins 14 and 14' implanted in the aforementioned shaft 11. This shaft 11 has at its end portion fixed thereon a sector wheel 15, through which meshes with a small gear 16' aligned with a gate cam gear 16. This gate cam gear 16 in turn meshes with an output gear 17' of an reversible drive source 17. As a result, when the shaft 11 is rotated clockwise by the drive of the gate drive source 17, the aforementioned push-up pins 14 and 14' turns upward the gate levers 12 and 12' through their extensions 12a and 12a' to lift the gate member 7, as shown in FIG. 4 A. In this lifted position of the gate member 7, on the other hand, if the aforementioned shaft 11 is rotated counterclockwise by the drive of the gate drive source 17, the push-up pins 14 and 14' and the gate levers 12 and 12' riding on the former are turned downward to lower the gate member 7, as shown in FIG. 4 B. At this time, the push-up pins 14 and 14' are allowed to relieve more that the angle at which the gate member 7 abuts against the documents on the document stacker 3. This causes the gate member 7 to hold the documents on the stacker by its own weight. Since the gate member 7 is followed by the aforementioned auxiliary levers 13 and 13' while it is moving up and down, its front face is kept in a generally normal position with respect to the upper surface of the document stacker 3. In other words, the gate member 7 is enabled to ride on the documents while having its front face normal to the document surface independently of the number of documents.

The aforementioned gate cam gear 16 is provided with a tongue 19 for shielding a sensor 18 for detecting the initial position thereof. This sensor 18 establishes a home position for the gate cam gear 16 when it is shielded with the tongue 19 so that it can rotate forward and backward the aforementioned drive source 17 by a necessary angle. This drive source 17 to be used in this case may preferably be a pulse-controllable stepping motor.

Reference numeral 20 designates a push-out belt for pushing out the documents from the predetermined position to the paper feed position. Numeral 21 designates a paper feeding belt for feeding out the documents in the paper feed position with the lowermost one first. Numeral 22 designates a stop roller contacting the paper feeding belt 21 for preventing any overlapped feed of the documents. The paper feeding belt 21 is made to run under tension between a drive shaft 23, which is connected to a main motor 100 through both an electromagnetic clutch 21a mounted on the drive shaft 23 and not-shown one-way control means, and a driven shaft 23' and to have its upper surface raised slightly from the ribs 3a of the document stacker 3.

Figure 5:
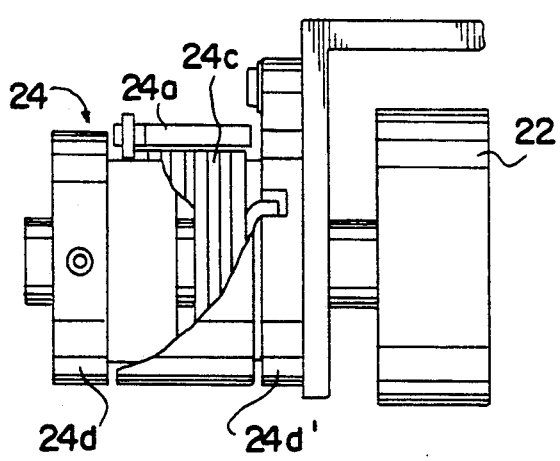
FIG. 5 is a partially cutaway front elevation showing a spring clutch fixed on a stopper roller shaft.
Figure 6:
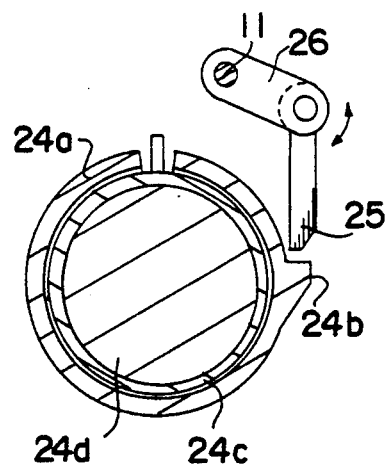
FIG. 6 is a sectional side elevation of the same.

On the shaft of the aforementioned stop roller 22, there is mounted a spring clutch 24. This spring clutch 24 is enabled, as shown in FIGS. 5 and 6, to relieve its spring 24c from spring bosses 24d and 24d' thereby to bring the stop roller 22 into freely rotatable state (for driven rotations) by pushing downward a projection 24b of a cylinder 24a by a clutch lever 25, and to regulate the rotations of the stop roller 22 when the clutch lever 25 exerts no action upon the projection 24b of the sleeve 24a. That clutch lever 25 is pivotally borne in a depending shape on the leading end of an arm 26 which in turn is fixed on the aforementioned shaft 11 in an opposite direction to that of the push-up pin 14 of the aforementioned gate lever. As a result, when the gate member 7 is lifted through the pin 14 by the rotations of the shaft 11, as shown in FIG. 4 A, the aforementioned clutch lever 25 is moved downward to push the projection 24b of the clutch 24 clockwise. When, on the other hand, the gate member 7 is moved downward to ride onto the documents 4 by the reverse rotations of the shaft 11, as shown in FIG. 4 B, the clutch lever 25 is brought upward apart from the projection 24b of the spring clutch 24 so that this spring clutch 24 is caused to restore its initial position by the action of its built-in spring thereby to regulate the rotations of the aforementioned stop roller 22.

The aforementioned push-out belt 20 is made of a holded belt, which is made to run under tension between the so-called "semicircular rollers" 28 and 29 having their outer circumferences partially cut away, to suck the lower sheet by means of a suction fan. Of the semicircular rollers, one 28 receives the driving force from the main motor 100 through a one-rotation spring clutch 30, as shown in FIG. 7, like the aforementioned paper feeding belt 21.

Figure 7:
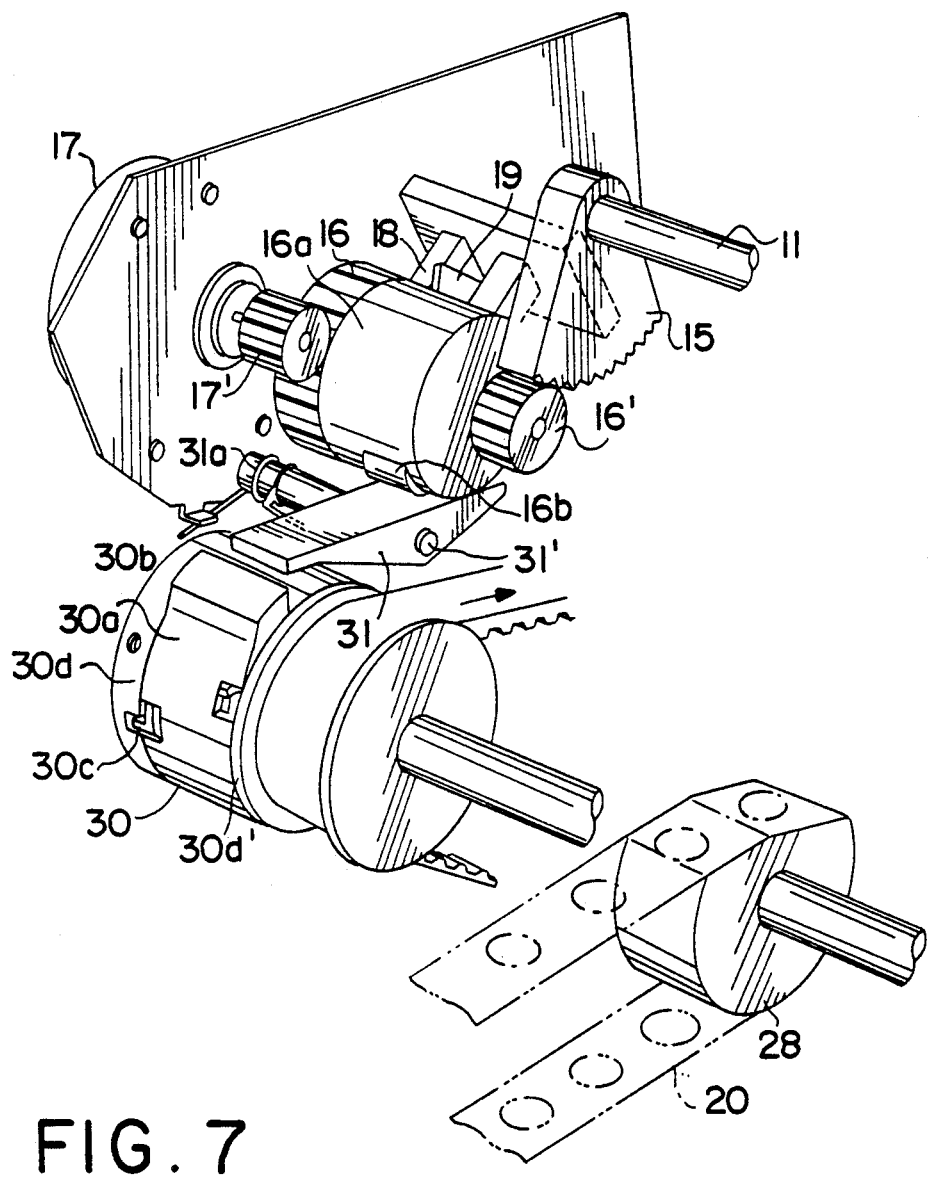
FIG. 7 is a perspective view showing one rotation control means of a semicircular roller.
Figure 8A:
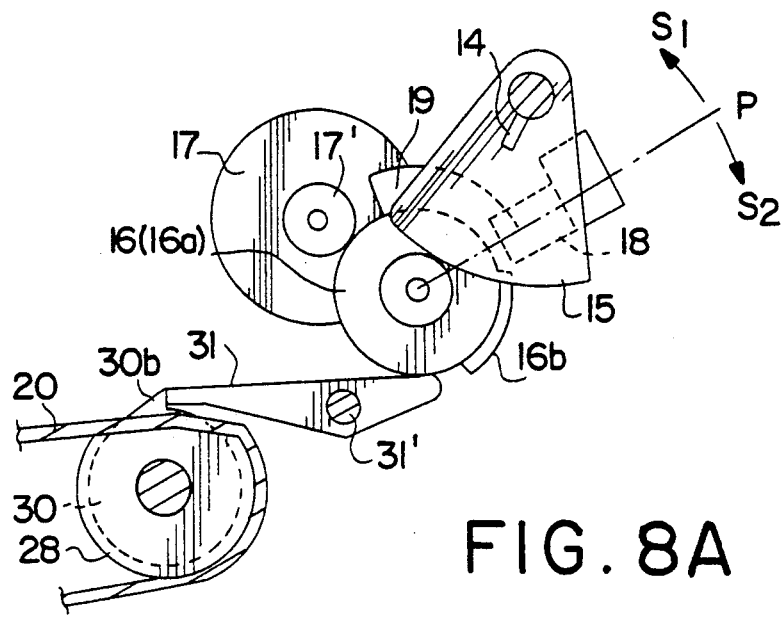
FIGS. 8 A and 8 B are explanatory views showing the operating states of the same one rotation control means.
Figure 8B:
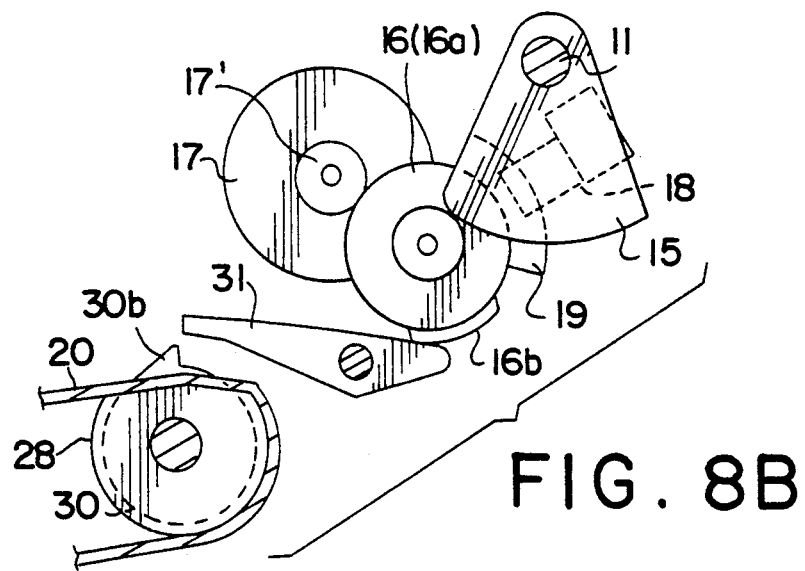

The one-rotation spring clutch 30 has its built-in clutch spring 30c loosened from spring bosses 30d and 30d' (as shown in FIG. 7) so that it is isolated from the driving force of the main motor 100, while a sleeve 30a has its projection 30b abutting against the leading end of a clutch lever 31 made movable up and down like a seesaw on a support 31', as shown in FIG. 8 A, so that its rotations are regulated. When, on the other hand, the leading end of the clutch lever 31 goes out of engagement with the projection 30b of the sleeve 30a of the spring clutch 30, as shown in FIG. 8 B, the clutch spring 30c fastens the spring bosses 30d and 30d' so that the driving force of the main motor 100 is transmitted to the semicircular roller 28.

The rear end of the aforementioned clutch lever 31 is forced into contact with the cylindrical portion 16a of the aforementioned gate cam gear 16 by the action of a tension spring 31a. The cylindrical portion 16a is provided with a cam-shaped land 16b on a portion of its circumference. As a result, when the gate cam gear 16 is rotated by the action of the drive source 17 of the gate member 7 to have its cam-shaped land 16b push down the rear end of the clutch lever 31, the leading end of this clutch lever 31 goes out of engagement with the projection 30b of the sleeve 30a of the spring clutch 30. The rocking motions of this clutch lever 31 are accomplished within such a rotational region of the gate cam gear 16 as is independent of the upward and downward drives of the gate member 7 during the downward movement of said gate member 7. In other words, the gate cam gear 16 has a home position (as indicated at reference letter P in FIGS. 8 A), which is determined by the initial position detection sensor 18 and the tongue 19, as has been described hereinbefore. The rotational region $S_1$, which is taken counterclockwise from that home position P, is used for moving the gate member 7 upward and downward, whereas the rotational region $S_2$ taken clockwise is used for locking the clutch lever 31.

Within the rotational region $S_2$ of the gate cam gear 16, specifically, the stepping motor acting as the aforementioned drive source 17 rotates clockwise from the above-specified point P to an extent corresponding to a constant number of pulses and then counterclockwise by the same number of pulses.

Here, in the rotational region $S_2$ of the gate cam gear 16 to be used for those rocking motions, the pushup pin 14 escapes from the gate lever 12, and the sector wheel 15 will skip to the small gear 16' at its tooth end.

When the leading end of the clutch lever 31 goes out of engagement from the projection 30b of the sleeve 30a, as has been described hereinbefore, so that the rotations of the semicircular roller 28 are started by the main motor, the gate cam gear 16 is rotated counterclockwise by the backward rotations of the gate driving source 17 so that the rear end of the clutch lever 31 is disengated from the cam-shaped land 16b and returned by the spring 31a to a position close to the sleeve 30a of the spring clutch 30 which has been passed at its leading end by the projection 30b. This projection of the sleeve 30a of the spring clutch, which has accomplished one rotation following the semicircular roller 28, comes again into abutment against the leading end of the clutch lever 31 to effect isolation of the driving force of the main motor 100. Thus, the semicircular roller 28 never fails to halt after each one rotation.

Figure 9A:
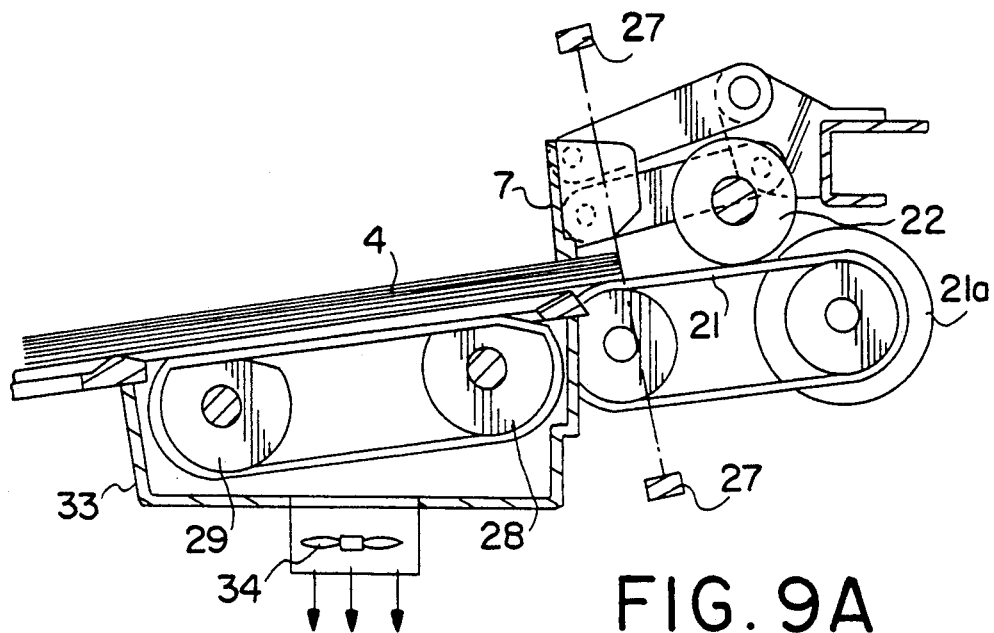
FIGS. 9 A and 9 B are explanatory views showing the operating states of a push belt (or semicircular roller)
Figure 9B:
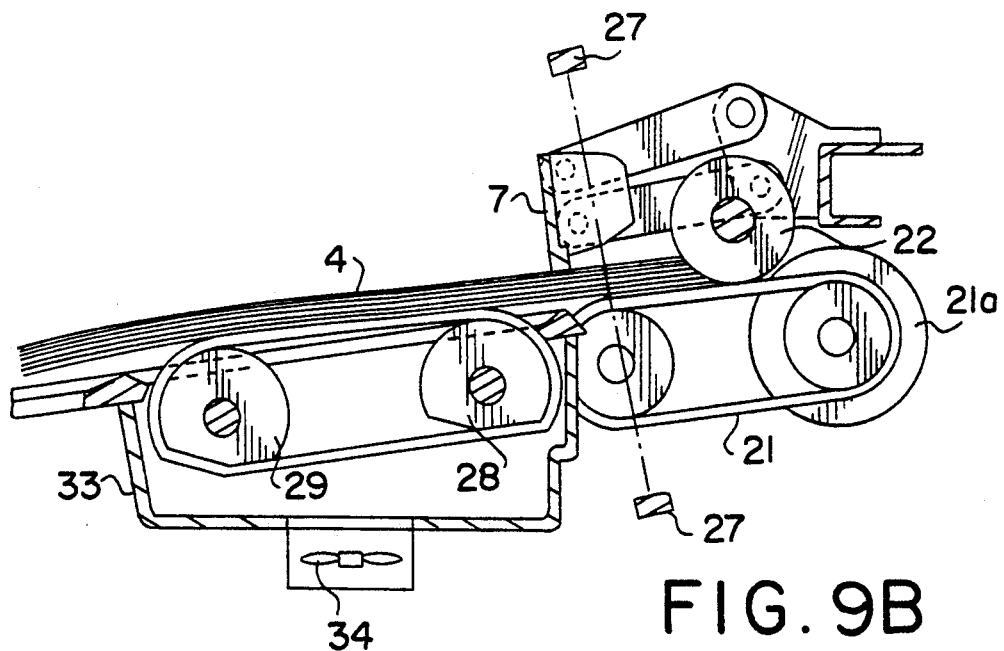

On the other hand, the aforementioned push-out belt 20 is disposed, as shown in FIG. 2, in each of apertures 32 which are juxtaposed to one another in a plurality of positions (e.g., in three positions, as shown) over the document stacker 3. Each aperture 32 has its peripheral edge rising to the same level as that of the ribs 3a of the document stacker 3 and sloped upstream of the paper feeding direction, as indicated at 32a, so that the leading ends of the documents may not be caught. Moreover, the upper belt surface will sink below the aperture 32, as shown in FIG. 9 A, when the semicircular roller 28 or 29 rotates to bring its cut-away portion up, but will bulge, as shown in FIG. 9 B, when the semicircular portion of the semicircular roller 28 or 29 is brought up. Specifically, the documents 4 in the fixed position on the document stacker 3 are frictionally pushed out by the push-out belts 20 bulging from the apertures 32 as the semicircular rollers 28 and 29 make one rotation. Since, in this case, the paper feeding belt 21 is halted because the power of the main motor 100 is interrupted by the action of the electromagnetic clutch 21a, the leading ends of the documents pushed out will bite in the form of a wedge into the nipping (or loosening) portion between the paper feeding belt 21 and the stop roller 22.

Reference numeral 33 designates a suction box which is disposed to surround each of the aforementioned push-out belts 20 from the lower side of the document stacker 3. The suction box 33 is enabled by the sucking action of its suction fun 34 to such the lowermost one sheet of the documents through the clearance between the aforementioned aperture 32 and the push-out belt 20 and through the belt holes so that the pushing-out force of the push-out belt 20 may be effectively exhibited.

Numeral 35 designates a forward passage for guiding the documents fed out by the aforementioned paper feeding means onto the platen glass plate 36 of the reproducing machine 1 acting as the processing unit 8. Numeral 37 designates a turning passage for turning the documents once fed onto said platen glass plate 36 before or after the exposure. This turning passage 37 is provided for correcting the turns of the even-numbered pages of two-sided documents toward the platen glass plate 36 and the sequence of the pages when the documents thus corrected and exposed are to be returned to the document stacker 3. Thus, the turning passage 37 merges into the upper portion of the aforementioned forward passage 35 after it has drawn an upward loop from the same plane as that of the aforementioned platen glass plate 36.

Numeral 38 designates a conveyor roller which is disposed midway of the aforementioned forward passage 35, whereas numerals 38 and 40 designate conveyor rollers which are disposed midway of the aforementioned turning passage 37. These conveyor rollers 38, 39 and 40 are so connected to the main motor 100 through one-way control means that they can rotate in the same feeding direction at all times.

Numeral 41 designates a conveyor belt for conveying the documents forward and backward on the upper surface of the platen glass plate 36. This conveyor belt 41 is made to run under tension between a first roller 42 connected at the feed side to the main motor 100 through forward/backward switching means 101 and a second roller 43 at the discharge side. A tension roller 44 is forced into contact with the upper belt surface near the first roller 42, and the lower belt surface is held in sliding contact with the platen glass plate 36 by a plurality of holding rollers 45.

Figure 10:
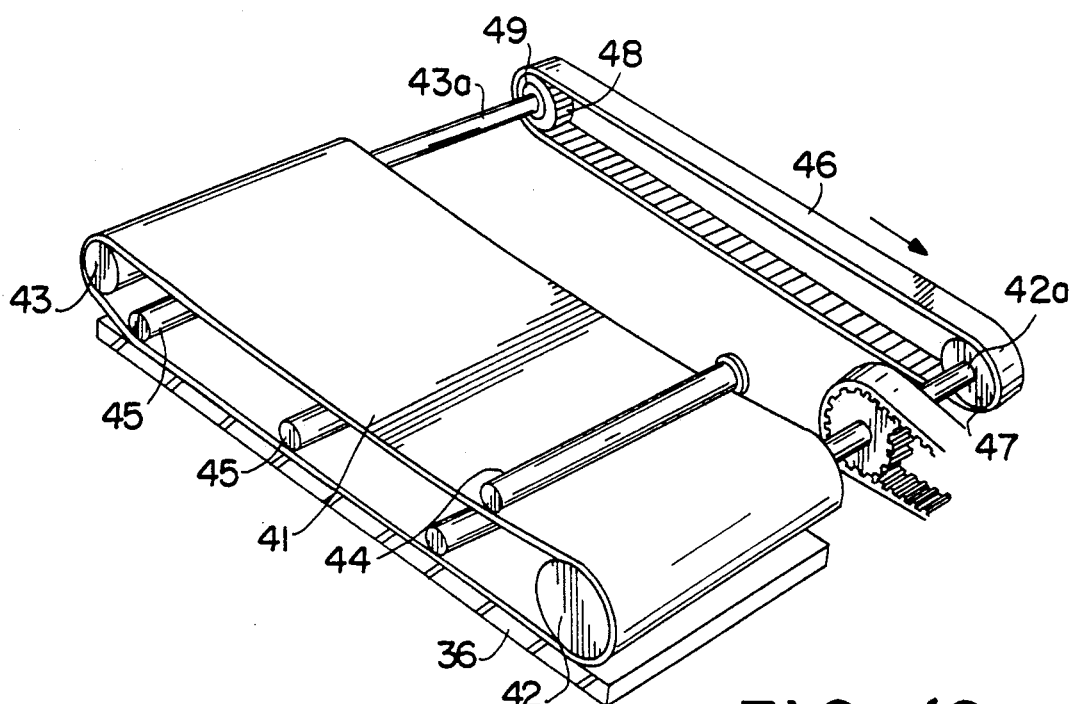
FIG. 10 is a perspective view showing the drive system of a conveyor belt.

The first roller 42 and second roller 43 described above are connected to each other through a timing belt 46, as shown in FIG. 10. In this connection, a timing pulley 47 located at the side of the first roller 42 is fixed on a first roller shaft 42a, and a timing pulley 48 located at the side of the second roller 43 is fixed on a second roller shaft 43a through a one-way clutch 49. Moreover, the circumferential speed of the first roller 42 is made slightly higher than that of the second roller 43 which is driven through the one-way clutch 49. As a result, the conveyor belt 41 is run in the forward direction (as indicated by arrow in FIG. 10) by the driving force of the first roller 42 to loosen the lower belt surface. Meanwhile, the second roller 43 is sliding through the one-way clutch 49 but is enabled to act as a drive side to drive the conveyor belt 41 by the action of the one-way clutch 49 which is locked when the conveyor belt 41 slips relative to the first roller 42, for example, by some cause so that is driving force is not fully transmitted to lower the running speed. When, on the contrary, the conveyor belt 41 is run in the opposite (i.e., counterclockwise) direction, the one-way clutch 49 is locked so that the second roller 43 acts as the drive side of the conveyor belt 41. In other words, the conveyor belt 41 can run with the drive side of either the first roller 42 or the second roller 43. This switching is effective especially when the documents are synchronously exposed while being fed on the platen glass plate.

Figure 11:
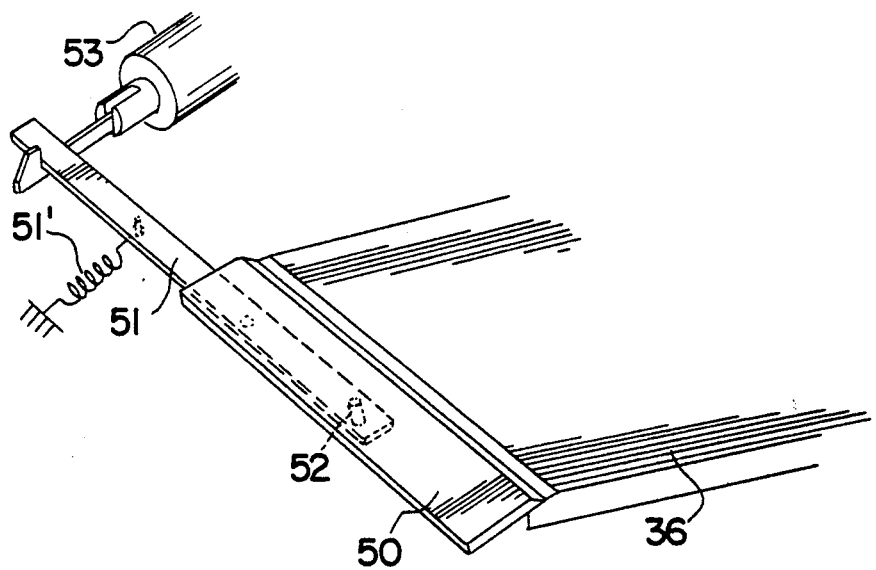
FIG. 11 is a perspective view showing the actuating mechanism of a document stopper.

Reference number 50 designates a document stopper which is disposed at the end portion of the platen glass plate 36 at the discharge side. As shown in FIG. 11, this stopper 50 is supported at its central portion through a connection pin 52 by one end of an actuating lever 51, which can rock like a seesaw, and is enabled to approach or retract from the platen glass plate 36 by the action of a solenoid 53 connected to the other end of the actuating lever 51 and a spring 51' facing the solenoid 53. The document stopper 50 thus constructed sinks from the platen glass plate 36 in the RDF mode, i.e., in the case the documents are exposed, while being conveyed at a synchronous exposure speed over the platen glass plate 36 by the conveyor belt 41, to form an image on a drum with an exposing optical system 54 being fixed, which is enabled to have its modes selected between a fixed mode positioned just below the platen glass plate 36 and a moving mode. In the ADF or SDF mode, on the other hand, in the case of documents are halted in the exposure position on the platen glass plate 36 so that they may be exposed to form an image on the drum with the optical system 54 being moved, the document stopper 50 bulges above the platen glass plate 36.

Numeral 55 designates a paper discharge guide plate which extends to the exit of the platen glass plate 36, and number 56 designates a discharge belt as a paper discharging member. This discharge belt 56 is so made to run under tension on a set of rollers: a drive roller 57 borne just behind the document stacker 3 and connected to the main motor 100 through one-way control means; upper and lower end rollers 58 and 59 borne to move horizontally along the upper and lower surfaces of the document stacker 3; and auxilliary rollers 60 and 61 borne in the vicinity of the aforementioned paper discharge guide plate 55, so as to surround the rear side of the document stacker 3 in the shape of letter "C". The discharge belt 56 thus constructed is enabled to convey in the discharging direction the documents which are fed out of the conveyor belt 41 as the aforementioned drive roller 57 rotates in a predetermined direction. These rollers and belts constitute paper discharging means.

Figure 12:
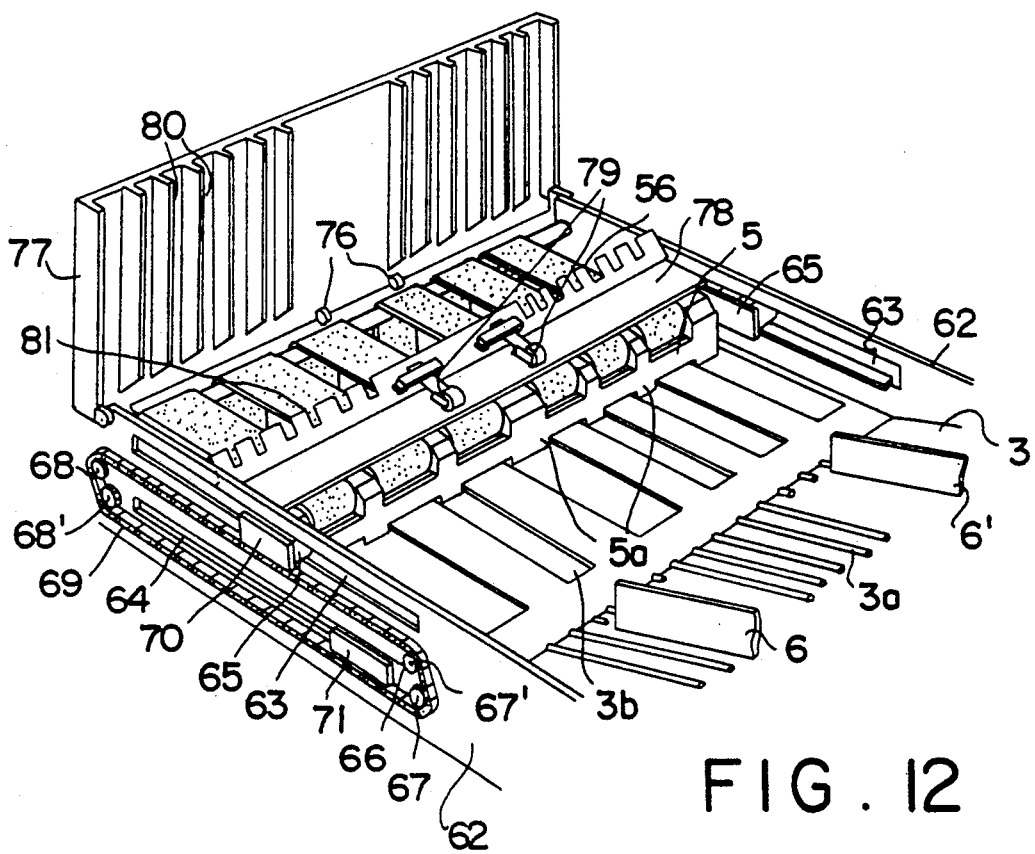
FIG. 12 is a perspective view showing the rear side of a document stacker.
Figure 13:
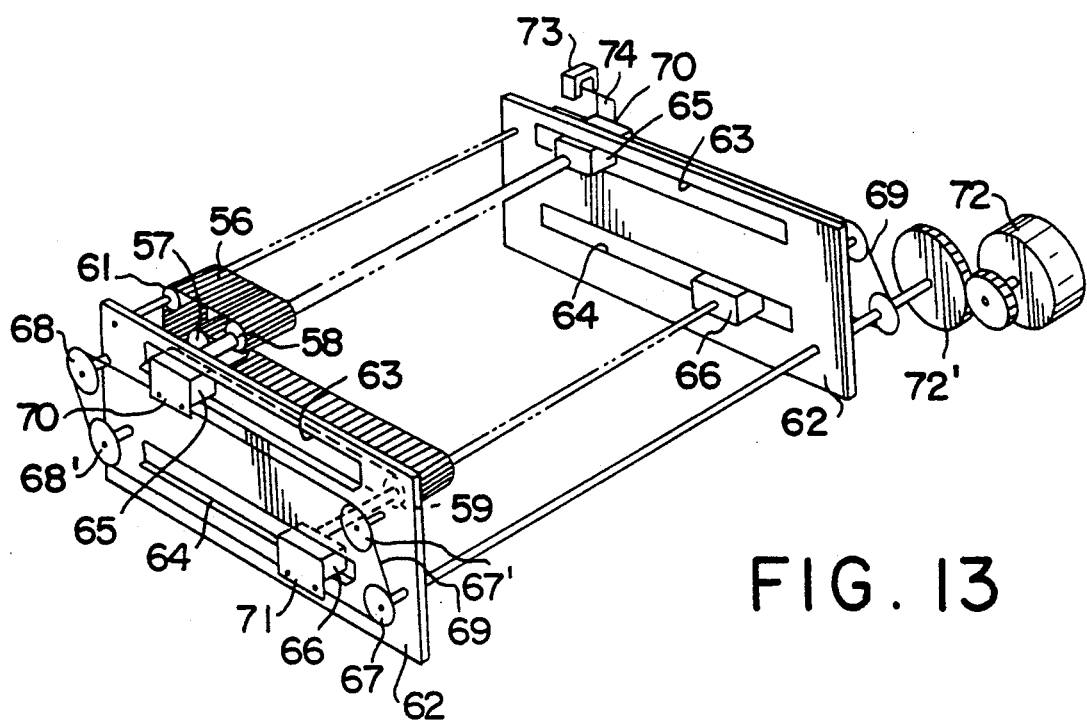
FIG. 13 is a schematic perspective view showing a drive means of a paper discharge belt and a rear end regulating member.

The upper and lower end rollers 58 and 59 of the paper discharging belt 56 are born, as shown in FIG. 12, between upper moving members 65 and lower moving members 66, respectively, which are held in a sliding manner through roller members in two parallel horizontal grooves 63 and 64 formed in the two side frames 62 of the document feeding apparatus 2. The respective moving members 65 and 66 are coupled through attachments 70 and 71 to the upper and lower sides of chains 69 which are made to run under tension on two sprockets 67 and 67' and two sprockets 68 and 68' borne in the front and back of the aforementioned two side frames 62. Moreover, the sprocket 67 located at the lower side of the front portion is connected through an intermediate gear 72' to an reversible chain drive source 72, as shown in FIG. 13. As a result, when the chain drive source 72 runs the chains 9 forward or backward, the belt portion located over the document stacker 3 moves forward or backward together with the upper end roller 58 which is borne on the upper moving member 65 whereas the lower belt portion moves backward or forward together with the lower end roller 59 borne on the lower moving member 66 so that the belt tension can always be maintained at a constant level.

The moving means of the paper discharging belt 6 is constructed as the movement control means of the aforementioned rear end regulating member 5 against which the documents have their rear ends abutting when they are to be set on their stacker 3. The rear end regulating member 5 is so fixed to the aforementioned upper moving members 65 as to cover the front of the upper end roller 58. The rear end regulating member 5 is provided, as shown in FIG. 12, at its lower end edge with extensions 5a which can be fitted in the shallow recesses 3b formed in parallel with the paper feeding direction in the upper surface of the rear portion of the document stacker 3 so that the documents to be pushed out may not sink below the rear end regulating member 5.

In FIG. 13, reference numeral 73 designates a home position sensor for the rear end regulating member 5. This sensor 73 defines as the home position of the rear end regulating member 5 the position, in which it detects a shielding member 74 mounted on the attachment 70 connected to the upper portion of the aforementioned chain 69. This home position determined the position, against which the rear end of the documents of a maximum size (e.g., the A3 size) can abut. Therefore, the longitudinal size of the documents can be read out in terms of the moving distance from that position to the position in which the leading end of the documents is detected by the aforementioned stack sensor 27. When this stack sensor 27 detects the leading end of the documents, moreover, it outputs not only a downward signal to the drive source 17 of the gate member 7 but also a stop signal to the drive source 72 of the chain 69 for moving the aforementioned moving members 65 and 66 and a signal, to said drive source 72, for retracting the rear end regulating member 5 from the front of the gate member by a distance corresponding to the read size of the documents of interest, as has been described hereinbefore.

Figure 14:
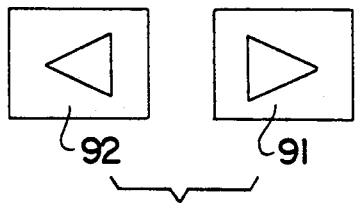
FIG. 14 is a view showing a home position designating button of the rear end regulating member.
Figure 15:
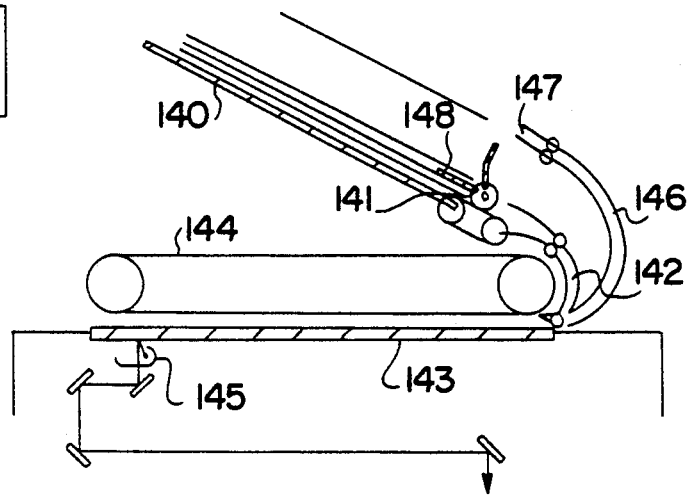
FIG. 15 is a schematic section showing the document feeding apparatus of the prior art.

In the case described above, the home position when the documents are set is made to exceed the maximum document size (i.e., A3 size) by means of the home position sensor. However, the home position sensor can specify another size and can select the rear end regulating position upon the setting operation in accordance with the operating situation of the user. As shown in FIG. 14, for example, home position designating buttons 91 and 92 are provided. If the user specify the documents of A4 size in the set position, he depresses the designating button 91 to move the rear end regulating member 5 rightward from the initial home position (i.e., the position of the home position sensor) and stops when the spacing from the gate member is substantially equal to the A4 size. If this position signal is stored, then the position can provide the home position of the rear end regulating member 5. On the other hand, this home position designation may be manually accomplished by the user to move the rear end regulating member 5 to a home position he desires. Then, time required for moving the rear end regulating member 5 can be shortened to complete the positioning operation within a shorter period.

Figure 16:
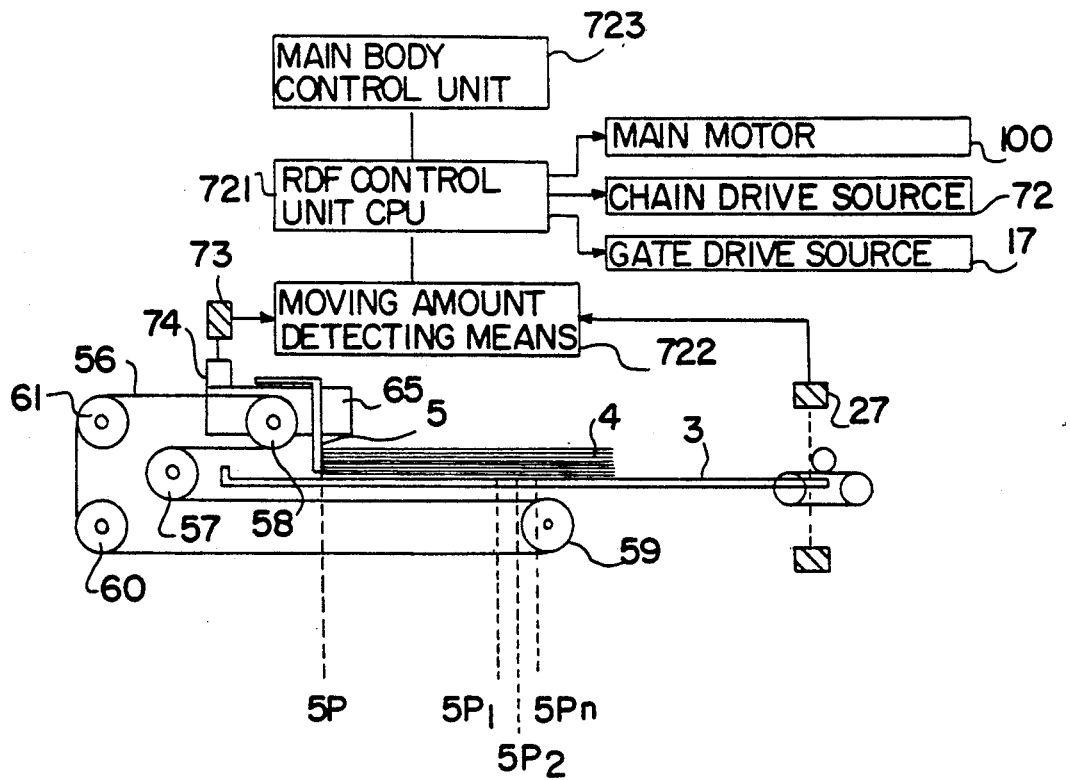
FIG. 16 is an explanatory view showing the aforementioned drive means.

The aforementioned rear end regulating plate 5 moves forward from the starting point of a home position, as indicated by 5P in FIG. 16. When the leading end of the documents 4 pushed out by the regulating plate 5 is detected by the stack sensor 27, this detection signal is received by a control unit 721. Then, this control unit 721 halts the chain driving source 72 and retracts the rear end regulating plate 5 to forward points $5P_1$, $5P_2$, - - -, and $5P_n$ (which are shifted according to the size of the documents). In this case, the rear end regulating plate 5 may be retracted all the way to the home position. In the present embodiment, however, the regulating plate 5 is retracted from the front of the gate member 7 by a distance required by that size of the documents of interest (i.e., the length of the documents in the feeding direction). In other words, the rear end regulating plate 5 is retracted by a distance equivalent substantially to the extent, over which the leading end of the documents passes under the gate member 7, so that its advance may be minimized when the documents having made one circulation are fed again.

The aforementioned document size (i.e., the length in the feeding direction) is detected by movement detecting means 722 in terms of the distance which is taken by the rear end regulating plate 5 from the home position to the detection position (or the foremost point) of the leading end of the documents detected by the stack sensor 27 In other words, the movement detecting means 722 can perform conversion of pulses into the document size by counting the number of pulses which are generated from a pulse generator (in which the chain driving source 72 itself may be a pulse motor) during the drive period of the chain driving source 72.

The detected value of this detecting means 722 is compared with that size information of the documents corresponding to the counted number, which is stored in advance in the control unit 721. If it is judged through this comparison by the control unit 721 that the size is appropriate, the control unit 721 controls the aforementioned chain driving source 72 to retract the rear end regulating plate 5 from the foremost point to the designated position corresponding to the document size of interest and outputs an operation signal to a control unit 723 disposed at the body of the reproducing machine.

If, on the contrary, it is judged that the size is inappropriate (for example. the documents are excessively small), the control unit 721 outputs operation inhibition signals to the main motor 100, the chain driving source 72, another driving source and the control unit 723 at the body side of the reproducing machine. At this time, a warning signal, if necessary, may be outputted to warning means (not shown).

Incidentally, the inhibiting operations of the control unit 721 of the document feeding apparatus and the control unit 723 of the reproducing machine body should preferable be accomplished after the documents passing in the passage have been discharged before exposed and after the transfer papers at the body have been discharged irrespective of their image forming states.

Reference numerals 75 and 76 designate holding rollers which are disposed in positions corresponding to the aforementioned auxiliary rollers 60 and 61 and in abutment against the paper discharging belt 56 from the outside of the paper discharging guide plate 55 through the aperture. Numeral 77 designates a ceiling guide plate which has its base end hinged to the upper portions of the rear ends of the two side frames 62 of the document feeding apparatus 2. Numeral 78 designates a discharge aperture guide plate which is disposed to face the upper moving members 65 bearing the aforementioned upper end rollers 58 at a small clearance from the upper surface of the upper belt portion of the paper discharging belt 56. Numeral 79 designates a holding roller which is in abutment against the paper discharging belt 56 through the aperture from the upper surface of said paper discharging aperture guide plate 78. The aforementioned ceiling guide plate 77 has its lower face serving as a guide surface provided with a plurality of ribs 80 arranged in the discharging direction to orient the documents. On these ribs 80, there are telescopically fitted notches 81 which are formed in the upper edge of the upward sloped rear plate of the paper discharging guide plate 78 so that the documents having advanced on the guide surface of the ceiling guide plate 77 may be guided without fail between the guide plate 78 and the paper discharging belt 56.

Numeral 82 designates a switching pawl which is disposed midway of the aforementioned paper discharging guide plate 55 for switching the processed documents between a circulating discharge passage A directed toward the document stacker 3 and an external discharge passage B directed to a paper tray 83 outside of the machine. This switching pawl 82 is made movable to open the external discharge passage B, when the aforementioned rear end 1 regulating member 5 is returned to the home position, and the circulating discharge passage A when the rear end regulating member 5 is not in the home position. This switching action may be accomplished by using either a solenoid or another suitable mechanical means.

Reference numeral 84 designates a manual insertion plate which has its base end hinged to the upper surface of the leading end of the aforementioned ceiling guide plate 77. This manual insertion plate 84 is usually folded on the upper surface of the ceiling guide plate 77, as shown in FIG. 1. When the documents are fed one by one in the SDF mode, the manual insertion plate 84 can be extended on its hinged portion to cover the document stacker 3. Upon this extension, the leading end of the manual insertion plate 84 approaches the paper feeding belt 21. Moreover, the manual insertion plate 84 is so marked on its extended upper surface as to indicate the size of the documents to be fed so that the user can acknowledge the document insertion position. When the manual insertion plate is extended, still moreover, a not-shown SDF actuator may advantageously be turned on.

Figure 18:
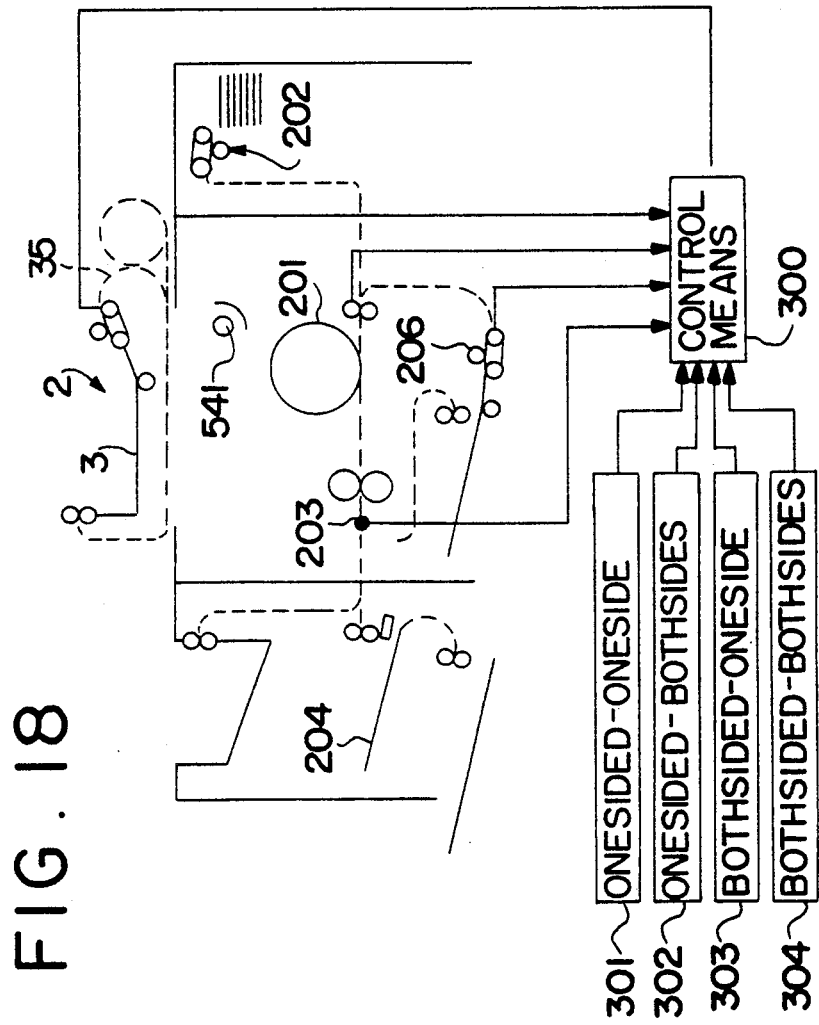
FIG. 18 is a schematic view showing a reproducing machine provided with the document feeding apparatus.

FIG. 18 schematically shows the reproducing machine 1 provided with a document feeding apparatus 2. When a document is fed from a document stacker 3 in the document feeding apparatus 2 of the reproducing machine 1 through a feeding passage 35 to a platen glass plate 36 and the leading end of the document reaches the platen glass plate 36, a light source 541 of an optical exposure system 54 illuminates the document to make a latent image on a photosensitive drum 201 of the reproducing machine 1 through a plurality of mirrors. The latent image is developed to provide a toner image. This toner image is copied on one side of transfer paper which is timely fed from a paper supply portion 202. When the paper is to be copied on only one side thereof, the paper is discharged from a turning point 203 to a paper discharging tray 204. When the paper is to be copied on both sides thereof, the paper is transferred from the turning point 203 to a transfer paper stacker 205 arranged under the photosensitive drum 201 and is reversed two times during the transfer so as to be stacked on the stacker with the copied side of the paper being upper side. When the paper with the one side being copied is to be copied on the other side, the paper is fed out the bottom of the stacker 205 by a stacker paper supply portion 206 at the front end of the stacker 205 and is supplied to the photosensitive drum 201 with uncopied surface being upper side after the paper has been reversed one time. The paper is then copied and discharged through the turning point 203 to the discharging tray 204. The eliminating of the optical exposure system 54, the supply timing of the paper supply 202, the operating of the turning point 203 and the supply timing of the paper supply portion 206 at the stacker 205 etc. are controlled by means of controller 300 which is operated according to the selection of copy mode in the document feeding apparatus 2. The selection of copy mode in the document feeding apparatus 2 is effected by depressing one of a one-sided document-one-side copy button 301, a one-sided document-both-side copy button 302, a both-sided document-one-side copy button 303 and a both-sided document-both-side copy button 304 which are arranged in an operation panel of the document feeding apparatus. The controller 300 is effected to process the document from the last page thereof when depressing either of the buttons 301-304.

Figure 17:
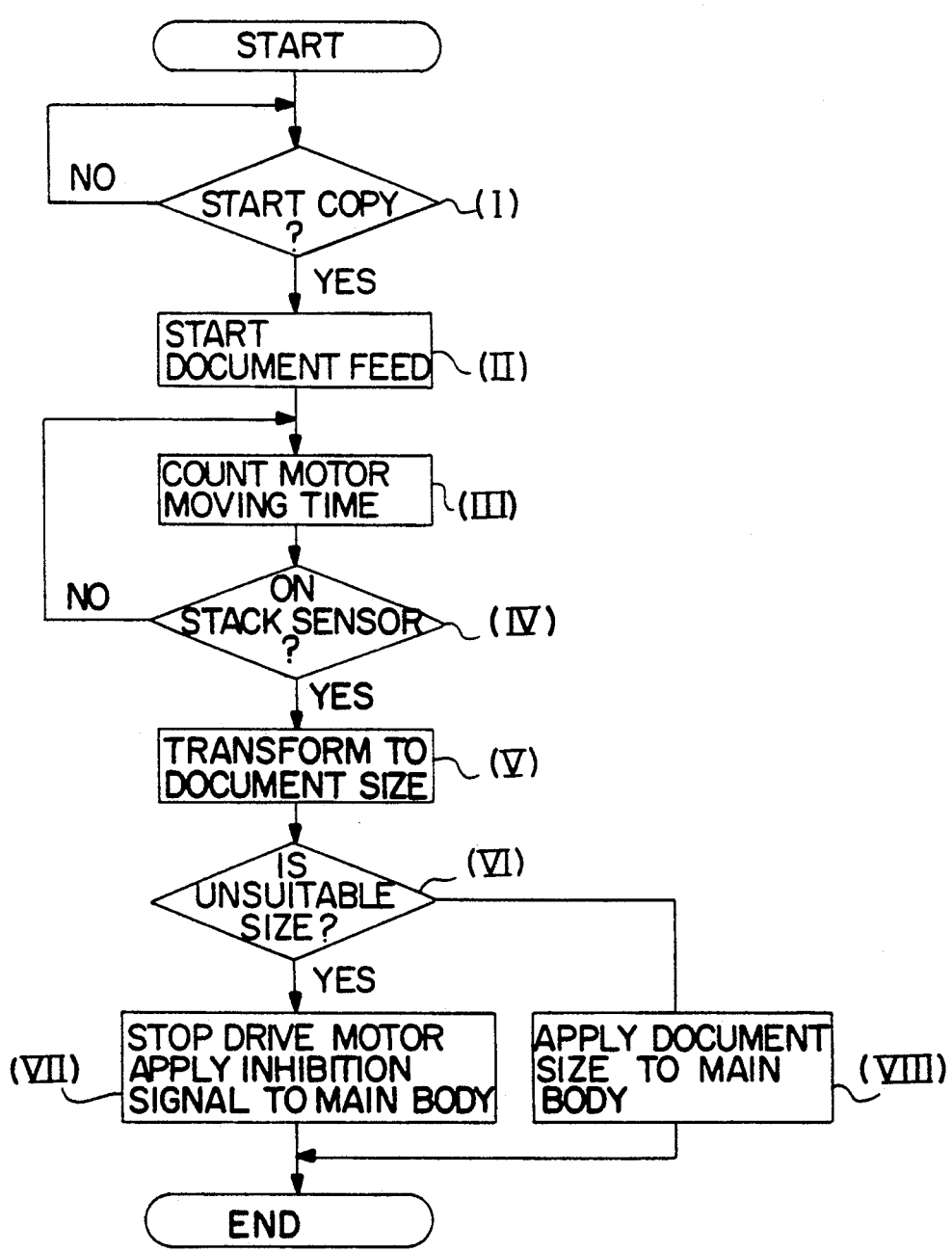
FIG. 17 is a flow chart.

In the embodiment thus far described, the documents are set in the laminated state by directing the copy surfaces upward and in the order of pages and by bringing their rear ends into abutment against the rear end regulating member 5 in the home position. After, the widthwise direction is regulated by the transverse width regulating plates 6 and 6' an RDF mode button is depressed and one of a one-sided document-one-side copy button 301, a one-side document-both-side copy button 302, both-sided document-one-side copy button 303 and a both-sided document-both-side copy button 304 is depressed to select a copy mode. After this, the number of copies is inputted, and the copy button is depressed to start the copying operations (at a step I), as shown in FIG. 17. Then, the gate driving source 17 for driving the gate member 7 is energized to lift the gate member 7 to a position, in which the laminated documents can sufficiently advance below the gate member 7.

Next, the chain driving source 72 is started to run the chain 69 forward through the intermediate gear 72' and the sprocket 67 so that the upper end rollers 58 borne on the upper moving members 65 connected to the upper and lower sides of the chain 69 through the attachments 70 and 71 are moved forward whereas the lower end rollers 59 borne on the lower moving members 66 are moved backward. As a result, the rear end regulating plate 5, which is so carried on the upper moving members 65 as to cover the front of the upper end rollers 58, feeds out the documents (at a step II). When the chain driving source 72 is started, the counter is operated to count the driving time of the driving source 72 (at a step III). When the leading end of the documents having passed below the gate member 7 is detected by the stack sensor 27 (at a step IV) so that the detection signal is outputted to the control unit 721, this control unit 721 interrupts the aforementioned chain driving source 72 after a predetermined number of pulses and determines the movement of the rear end regulating plate 5 to convert the movement into the document size (at a step V). If the document size is compared with the document information stored in advance to reveal that the document size is inappropriate (at a step VI), the operation inhibiting signals are outputted to the main motor 100, another driving source and the control unit 723 of the body of the reproducing machine (at a step VII). Unless inappropriate, the aforementioned chain driving source 72 is reversed to make such a control that the rear end regulating plate 5 can be retracted from its foremost point to a designated position corresponding to the document size of interest, and the document size is outputted to the control unit 723 of the body of the reproducing machine or the like (at a step VIII).

The subsequent operations are as follows. The gate driving source 17 is energized to move the gate member 7 downward. At this time, the pin 14 implanted in the shaft 11 turns to be moved far away from the gate lever 12 so that the gate member 7 can always push down the upper surface of the documents by its own weight or by a spring regardless of the volume of the documents. Since this gate member 7 has its lower edge shaped in comb teeth, it can push the documents onto the paper feeding belt 21 while undulating the documents in cooperation with the ribs 3a formed on the upper surface of the document stacker 3.

In the position in which the push-up pin 14 is far apart from the gate lever 12, as has been described hereinbefore, the gate cam gear 16 is rotated by the gate driving source 17 to rock up and down the clutch lever 31, which is retained on the projection 30b of the sleeve 30a of the one-rotation spring clutch 30, with its cam forming land 16b thereby to connect the semicurcular rollers 28 and 29 to the main motor 100 so that the push-out belt 20 is run. Then, the documents are pushed out toward the nip between the paper feeding belt 21 and the stop roller 22. Since, at this time, the paper feeding belt 21 is left irrotational by the action of the electromagnetic clutch 21a, the lower ones of the documents pushed out advance in the form of a wedge into the nip between the paper feeding belt 21 and the stop roller 22.

Next, the electromagnetic clutch 21a is turned on to run the paper feeding belt 21 in the paper feeding direction. Since, at this time, the stop roller 22 contacting the paper feeding belt 21 is held irrotational, the lowermost one of the documents is fed out by the paper feeding belt 21 whereas a second or subsequent documents are suppressed by the stop roller 22 so that the overlap feed is prevented. During rotations of this paper feeding belt 21, the aforementioned push-out belt 20 is synchronously started to that only the lowermost document is sucked and separated during one rotation from the laminated documents and is pushed out in the paper feeding direction. In other words, the overlap preventing function of the stop roller is further improved.

After this, the rear end regulating member 5 is retracted, when the chain driving source 72 is reversed, together with the upper end rollers 58 which are moved backward while being moored by the chain 69. In this case, the lower end rollers 59 are moved forward so that the tension of the paper discharging belt 56 remains unchanged. The rear end regulating member 5 is enabled in advance to read as the document size the moving distance of the leading end of the documents 4 from the home position to the position in which it is detected by the aforementioned stack sensor 27. Thus, the rear end regulating member 5 is retracted while leaving a distance from the front of the gate member 7 by the size read out. As a result, like the rear end regulating member 5, the paper discharge aperture, which is defined by the paper discharge aperture guide plate 78 carried on the upper moving member 65 and the holding rollers 79 forced in contact with the guide plate 78, is allowed to take different positions for different document sizes.

One document thus fed out from the paper feeding belt 21 enters the forward passage 35 and is conveyed at a synchronous exposure rate, while being nipped by the conveyor roller 38, to the platen glass plate 36 and the conveyor belt 41. At a timing for each size after the leading end of the document has passed across a synchronous sensor 85 disposed midway of the forward passage 35 (i.e., immediately under the conveyor roller 38), the electromagnetic clutch 21a is turned off.

The document thus conveyed by the aforementioned conveyor roller 38 is exposed by the fixed optical system 54 to form an image on the drum while being conveyed at the synchronous exposure rate on the platen glass plate 36 by the conveyor belt 41. The document thus exposed is moved upward along the paper discharge guide plate 55 until it is discharged to the document stacker 3 by the paper discharging roller 56. In this case, the document is supported by the paper discharge aperture guide plate 78 and the holding rollers 79, 75 and 76 abutting against the roller supporting portion of the paper discharging belt 56 through the aperture from the outer surface of the paper discharge guide plate 55 forming the paper discharge passage. Even if the paper discharge aperture shifts its position in accordance with the document size or the like, the document fed out from the platen glass plate by the conveyor belt never fails to be nipped, irrespective of the size thereof, between the conveyor belt and the paper discharge aperture so that it never fails to be discharged.

Moreover, the documents discharged onto their stacker 3 are stacked again so that their leading and trailing ends are arranged by the gate member 7 and the rear end regulating plate 5 and their widths are arranged by the width regulating plates 6 and 6'. This improves the paper feeding performance of the subsequent cycle.

The feeding operations thus far described are repeated at different feed timings and synchronous conveyance speeds, which are determined differently for each copy size and magnification, until the documents below the gate member are exhausted. If it is detected by the stack sensor 27 that no document is present below the gate and it is detected by a discharge sensor 86 that the last document has been discharged, the gate member 7 is lifted again to feed out the stacked documents with the rear end regulating plate 5 so that the aforementioned operations may be repeated. If the set number of documents have been completed and if this completion is detected by the aforementioned discharge sensor 86, the rear end regulating plate 5 returns to its home position so that it is ready for the subsequent operations.

During the aforementioned operations, on the other hand, the clutch lever 25 to act upon the projection 24b of the sleeve 24a of the spring clutch 24 mounted on the shaft of the stop roller 22 is in its inoperative position while the gate member 7 is lowered and placed on the documents. As a result, the stop roller 22 is left irrotational because the spring of the spring clutch 24 is tightened, even if it receives the counterclockwise rotating force from the paper feeding belt 21 so that the overlap feed of the documents can be prevented without fail.

The following description involves the case in which the manual insertion plate 84 is extended to feed the documents in the SDF mode.

If, in this case, the gate member 7 is brought to its lifted position, the clutch lever 25 acts upon the projection 24b of the sleeve 24a of the spring clutch 24, which is mounted on the shaft of the stop roller 22, to loosen the spring action of the spring clutch 24 so that the stop roller 22 can follow the rotations of the paper feeding belt 21. As a result, the documents can be manually inserted and smoothly fed out while being nipped between the paper feeding belt 21 and the stop roller 22 following the belt 21.

In the case the home position of the rear end regulating member 5 is a position which is designated by user depressing designation buttons 91 and 92, time required for moving the rear end regulating member 5 can be shortened to be quickly prepared for the subsequent processing.

The operations described above provides the case in which one-sided documents are subjected to the one-side copying operation in the RDF mode. As a result, the document stopper 50 disposed at the end portion of the discharge side of the platen glass plate 36 of the reproducing machine 1 sinks below the platen glass plate 36, and the exposing optical system 54 is in the fixed mode at a predetermined position. If the mode is changed to the ADF mode, the exposing optical system 54 is accordingly changed to the moving mode, in which the document stopper 50 disposed at the end portion of the discharge side of the platen glass plate 36 appears from the surface of the platen glass plate to halt the documents a- its position (i.e., the exposure position) so that a set number of copies are copied by moving the exposing optical system 54. After this, the documents are conveyed in the discharging direction by the restart of the conveyor belt 41 and the retraction of the document stopper 50 having sunk, until they are discharged through the switching pawl 82 disposed midway of the paper discharge guide plate 55 from the external discharge aperture to the discharge tray 83.

On the other hand, at the case be considered, in which one-sided documents are subjected to a two-side copying operation. In this case, the documents set on their stacker are first circulated once while being unexposed so that the number of the documents may be counted and judged whether they are even or odd. This counting operation is accomplished by operating a counter (although not shown) through the sensor 85 which is disposed midway of the forward passage 35. If the number is four, for example, the last fourth page of the documents, which have been fed to the platen glass plate 36 from the document feeding apparatus 2, is copied at the reproducing machine body 1 to one side of transfer paper. Then, the documents are returned to their stacker 3, and the transfer paper having its one side copied is stacked with its copied side facing upward on a transfer paper stacker (although not shown) disposed below the photosensitive drum (although not shown). The transfer paper having its one side copied is fed, synchronously with the document of the third page fed from the document feeding apparatus 2 onto the platen glass plate, to the photosensitive drum from its stacker with its uncopied side facing upward, until the third page is copied and discharged. This is repeated likewise for the second and first pages. If the documents have three pages, the last third page is copied and discharged instantly, the transfer paper having copied the second page is fed to the transfer paper stacker, from which is fed the first page until it is copied and discharged.

In the case two-sided documents are subjected to a one-side copying operation, on the other hand, the documents sent out from their stacker are fed through the forward passage 35 onto the platen glass plate 36. Then, the last page is on the top of the documents on the platen glass plate 36. (1) The document once fed onto the platen glass plate 36 is halted at the timing when its trailing end rides on the glass plate. (2) The conveyor belt 41 is reversed to feed the document to the turning passage 37 thereby to turn the document upside down. The documents are exposed on the platen glass plate 36 by the fixed optical system 54 with the last page being in the lowermost position. In synchronism with this, the transfer paper fed from the paper feeding unit (although not shown) of the reproducing machine body 1 is copied until this copied transfer paper is discharged as it is. (3) The exposed documents are fed again by reversing the conveyor belt 41 so that their page order may be corrected through the turning passage 37. The documents are exposed on the platen glass plate 36 with their other pages facing downward and are copied to the subsequent transfer paper fed from the paper feeding unit of the reproducing machine body 1. After this, the documents are returned to their stacker 3. The one-side copying operations of the two-sided documents are completed by repeating the above-specified operations (1) to (3).

In the case the two-sided documents are subjected to a one-side copying operation, on the other hand, they are first copied only on their even-numbered pages. Specifically, after the documents have been fed to the platen glass plate, they are turned through the turning passage 37 so that each of the even pages is exposed, while being directed downward, and copied to one-side of transfer paper. After this, the documents are returned again through the turning passage 37 to their stacker 3, while being left unexposed, whereas the one-side copied transfer paper is stacked on its stacker in the reproducing machine body 1. After all the even-numbered pages have been thus copied, the copying operations of odd-numbered pages are started. For these copying operations of the odd-numbered pages, the turning operations of the documents are not required, and the transfer paper is sent out from its stacker so that the other sides of the one-side copied transfer paper is copied. Specifically, the third page is copied on the other side of the transfer paper copied with the fourth page, and the first page is copied on the other side of the transfer paper with the second page.

As has been described hereinbefore, the present invention is characterized in that the member for regulating the rear end of the documents is disposed movably in the document feeding direction at the back of the document stacker having the paper feed unit in its front. This makes it possible to push out the documents set on their stacker to the paper feeding unit without steeply sloping the stacker, unlike the prior art, so that the whole height can be held at a low level. The rear end regulating member can be retracted in accordance with the size of the documents to be returned onto their stacker, and the restacked documents can be arranged so that they may be prepared for the subsequent feeding operation to make a contribution to an improvement in the paper feeding performance. Since, moreover, the documents are circulated in the closed loop, other various benefits are obtained such as quicker document interchange.

According to the present invention, moreover, both the drive source of the one-rotation control means of the push-out belt for pushing out the documents, which have been brought to a predetermined position by the rear end regulating plate, to the paper feed position and the drive source for the driven rotation control means of the stop roller for contacting with the paper feeding belt, which sends out the documents in the paper feed position from their lowermost sheet, to prevent the overlap feed are used commonly with the drive source for the up and down drive means of the gate member so that the number of parts can be reduced to simplify the construction of the paper feeding unit. The resultant effect is that the apparatus as a whole can be produced with a small size and at a low cost.

Furthermore, since the drive source of the one-rotation control means of the push-out belt and the drive source of the drive means of the gate member are common, none of the malfunctions of allowing the gate member to rise during the run of the push-out belt or the push-out belt to run with the gate member being in the lifted position will be encountered so that the reliable paper feed can be accomplished without fail.

Furthermore, the separating means of the ADF and RDF operations can be released so long as the stop roller holds the gate member in their lifted state. The documents can be fed without any damage even if the paper feed aperture for the ADF or RDF operation is identical to that of the SDF operation.

Furthermore, if the document feed is accomplished in the SDF mode to cause the stop roller to follow, the loosening point can be shifted at will to provide advantages especially for overcoming a wear or powdering problem in the ADF or RDF mode.

According to the present invention, furthermore, the document feeding apparatus having the rear end regulating plate at the back of the document stacker for pushing out the documents toward the paper feeding aperture, comprises: means for detecting the initial position of the rear end regulating means; means for detecting the leading ends of the documents in the vicinity of the paper feeding aperture; means for detecting the leading ends of the documents in the vicinity of the paper feeding aperture; means for detecting the movement from the initial position to the position in which the leading ends of the documents are detected; and means for detecting the document size in based on the movement. As a result, the documents set or restacked on their stacker can be fed without steeply sloping the stacker. At the same time, the documents fed from their stacker can be returned to the stacker in the closed loop through the processing unit so that the document interchange can be speeded up. Moreover, the initial set documents can have their size judged at the instant when they are moved to the paper feed aperture. As a result, the rear end regulating plate can be retracted to a designated position determined for each document size, before the first one of the documents having fed is returned to the document stacker through the processing unit. This makes it possible to arrange neatly the restacked documents processed, to improve the separating performance of the documents repeatedly fed. At the same time, another excellent benefit is that it is possible to prevent the trouble such as jamming which occurs when documents of inappropriate size are fed.

What is claimed is:

1. A document feeding apparatus comprising:
   a conveyor belt for moving documents along a platen glass plate of a photoreducing machine;
   first and second rollers for supporting said conveyor belt;
   a driving source connected to said first roller; and
   a member, separate from said belt and spaced apart therefrom, for driving said second roller whereby said second roller serves to prevent said conveyor belt from slackening.

2. The apparatus of claim 1 wherein said first roller is connected to said second roller by a one-way clutch.

3. The apparatus of claim 2 wherein a line speed of said first or second roller on a document feed side is greater than a line speed of said first or second roller on a document discharge side when said conveyor belt is normally rotated.

4. The apparatus of claim 1 wherein said member connects said first roller with said second roller so that said second roller is connected to said driving source through said first roller.

5. The apparatus of claim 1 wherein said member comprises a belt and a one-way clutch, wherein said one-way clutch is mounted on said second roller, said belt is stretched around said first and second rollers, and said second roller is connected to said driving source through said belt and said one-way clutch.

* * * * *